(12) United States Patent
Edelson (10) Patent No.: US 6,570,361 B1
(45) Date of Patent: *May 27, 2003

(54) ROTATING INDUCTION APPARATUS

(75) Inventor: Jonathan Sidney Edelson, Hillsboro, OR (US)

(73) Assignee: Borealis Technical Limited, Gibraitar ( * ) Notice: Subject to any disclaimer, the term of this patent is extended or adjusted under 35 U.S.C. 154(b) by 0 days.

This patent is subject to a terminal disclaimer.

(21) Appl. No.: 09/255,291

(22) Filed: Feb. 22, 1999

(51) Int. Cl.$^7$ .............................................. H02P 7/628

(52) U.S. Cl. ........................ 318/801; 318/807; 318/810; 318/811

(58) Field of Search ................................. 318/138, 254, 318/439, 727, 737, 798, 799, 800, 801, 802, 803, 807, 810, 811

(56) References Cited

U.S. PATENT DOCUMENTS

| 1,356,933 | A | | 10/1920 | Macmillan | |
|---|---|---|---|---|---|
| 1,427,360 | A | | 8/1922 | Chubb | |
| 3,127,548 | A | * | 3/1964 | Emden | 318/254 |
| 3,453,512 | A | * | 7/1969 | Polakowski | 318/138 |
| 3,584,276 | A | | 6/1971 | Ringland | |
| 3,603,866 | A | * | 9/1971 | Opal | |
| 3,611,104 | A | | 10/1971 | Jaial | |
| 3,641,417 | A | | 2/1972 | Gyugyi | |
| 3,663,877 | A | * | 5/1972 | Clark | 318/254 |
| 3,713,504 | A | | 1/1973 | Shimer et al. | |
| 3,781,615 | A | * | 12/1973 | Mokrytzki et al. | |
| 3,832,625 | A | | 8/1974 | Gyugyi | |
| 3,908,130 | A | | 9/1975 | Lafuze | |
| 3,917,988 | A | * | 11/1975 | Payne | 318/138 |
| 4,013,937 | A | | 3/1977 | Pelly et al. | |
| 4,023,083 | A | | 5/1977 | Plunkett | |

(List continued on next page.)

OTHER PUBLICATIONS

Drozdowski. P. "Equivalent Circuit and Performance Characteristics of 9–Phase Cage Induction Motor." ICEM'94, Paris, France, vol. 1, 118–123 (1994).

Klingshern. E. "High Phase Order Induction Motors–" IEEE Transactions on Power Apparatus and Systems, vol. PAS–102, No. 1: 47–59 (1983).

Koseki, T. et al. "Novel Linear Induction Drives: Control Scheme and Converters." 4$^{th}$ European Conf. EPE'91 , Florence, vol. 1: 481–486 (1991).

Pessina. G. "Boundaries in Multispeed A.C. Systems." Proc. of Int. Conf. "Evolution and Modern Aspects of Induction Machines", Torino Italy: 224–231 (1986).

Pessina. G. "Two Speed Commutated 5–Phase Induction Motor." Proc. of ICEM'86, Munchen, Germany, vol. 1: 199–202 (1986).

Sobczyk. T. et al. "Steady–State Equations of Multiphase Squirrel–Cage Induction Motors." Proc. of ICEM'86, Munchen, Germany, vol. 2: 393–396 (1986).

Toliyat. H. et al. "Analysis of a Concentrated Winding Induction Machine for Adjustable Speed Drive Applications Part 1 (Motor Analysis)." IEEE Transactions on Energy Conversion, vol. 6, No. 4: 679–692 (1991).

*Primary Examiner*—Bentsu Ro (57) ABSTRACT

An electrical rotating apparatus comprises an inverter system that outputs more than three phases. The apparatus further includes a stator comprising a plurality of slots and full span concentrated windings, with the windings being electrically coupled to the inverter system, and a rotor electromagnetically coupled to a magnetic field generated by the stator. A signal generator generates a drive waveform signal, that has a fundamental frequency, and the drive waveform signal drives the inverter system. The drive waveform signal has a pulsing frequency and is in fixed phase relation to the fundamental frequency. Additionally, the inverter system may be fed by a drive waveform signal that is fed through at least one signal delay device.

17 Claims, 4 Drawing Sheets

U.S. PATENT DOCUMENTS

| | | | |
|---|---|---|---|
| 4,093,869 A | | 6/1978 | Hoffmann et al. |
| 4,161,680 A | | 7/1979 | Akamatsu |
| 4,218,646 A | | 8/1980 | Akamatsu |
| 4,328,454 A | * | 5/1982 | Okuyama et al. ........... 318/803 |
| 4,352,155 A | | 9/1982 | Gyugyi |
| 4,456,865 A | * | 6/1984 | Robertson, Jr. et al. .... 318/599 |
| 4,476,422 A | | 10/1984 | Kirschbaum |
| 4,484,127 A | | 11/1984 | Salihi et al. |
| 4,626,750 A | * | 12/1986 | Post .......................... 318/139 |
| 4,651,079 A | * | 3/1987 | Wills ......................... 318/811 |
| 4,749,933 A | | 6/1988 | ben-Aaron |
| 4,833,588 A | | 5/1989 | Schauder |
| 4,849,871 A | * | 7/1989 | Wallingford ................ 363/41 |
| 4,914,335 A | | 4/1990 | Horton et al. |
| 4,928,051 A | | 5/1990 | Demeter et al. |
| 5,070,291 A | * | 12/1991 | Nakamura et al. .......... 318/771 |
| 5,075,610 A | | 12/1991 | Harris |
| 5,129,328 A | | 7/1992 | Donnelly |
| 5,194,796 A | | 3/1993 | Domeki et al. |
| 5,198,741 A | | 3/1993 | Shinada et al. |
| 5,198,972 A | | 3/1993 | Lafuze |
| 5,216,339 A | * | 6/1993 | Skybyk ...................... 318/254 |
| 5,294,875 A | | 3/1994 | Reddy |
| 5,298,848 A | | 3/1994 | Ueda et al. |
| 5,334,898 A | | 8/1994 | Skybyk |
| 5,365,158 A | | 11/1994 | Tanaka et al. |
| 5,394,321 A | | 2/1995 | McCleer et al. |
| 5,552,640 A | | 9/1996 | Sutton et al. |
| 5,661,379 A | * | 8/1997 | Johnson ...................... 318/139 |
| 5,786,673 A | * | 7/1998 | Johnson ...................... 318/139 |
| 6,054,837 A | * | 4/2000 | Edelson ...................... 318/801 |

* cited by examiner

ROTATING INDUCTION APPARATUS

TECHNICAL FIELD OF THE INVENTION

This invention relates generally to rotating induction apparatus and more specifically to rotating induction apparatus that are tolerant of harmonics.

BACKGROUND OF THE INVENTION

In a rotating induction apparatus, a current of electrical charge generated within a magnetic field experiences a force perpendicular to the flow of charge and to the lines of force of the magnetic field. If a conductor is forced through a magnetic field by some sort of an external prime mover, an electrical current is caused to flow; this is the principle of the operation of an electrical generator. When an electrical current flows through a conductor in a magnetic field, a force is applied to the conductor; this is the principle of the operation of an electrical motor.

In an alternating current (AC) induction motor, a rotating magnetic field is produced by the stator or stationary portion of the apparatus. This rotating magnetic field interacts with current carried by conductors of the rotor, causing the rotor to turn. It also produces currents in the rotor conductors by transformer action. Thus, the rotor needs no connections to an electrical supply, and is simply supported by bearings which allow free rotation.

The rotating magnetic field is produced by coils of wire or windings, suitably positioned on the stator. Each winding, when energized with a direct current, would produce a fixed magnetic field. By energizing a winding with a sinusoidal AC, a smooth varying magnetic field of fixed orientation may be produced. By positioning several windings of differing orientations on a single stator and energizing the windings with alternating currents of differing phase, a rotating magnetic field is produced which is the sum of the time-varying fixed orientation magnetic fields generated by each winding/phase. The stator is defined as the stationary part of the magnetic circuit and these stator windings.

The rotating field produced by the stator windings is complex and irregular. By the principal of superposition, the rotating field may be analyzed as being composed of numerous rotating fields of different shape, including a fundamental or desired lowest frequency structure. The rotating field is composed of this fundamental field and higher frequency harmonic fields.

The excitation currents may similarly be complex, and may be analyzed as being composed of several different harmonic currents. The fundamental excitation current is the primary source of torque.

Spatial harmonics, or air-gap harmonics, are harmonic fields generated by the non-sinusoidal nature of the field generated by each winding. When spatial harmonics are excited by the fundamental drive currents, they produce a secondary rotating field that rotates slower than the fundamental field. For a given excitation frequency, spatial harmonic fields rotate more slowly than the fundamental field.

Harmonic fields generated by non-sinusoidal drive waveforms are termed temporal harmonics. Rotating fields produced by temporal harmonic currents rotate more rapidly than the fundamental field. When temporal harmonics excite the fundamental spatial field, they produce a secondary rotating field that rotates more rapidly than the fundamental field and may rotate in the opposite direction to the fundamental field.

Therefore, both spatial and temporal harmonics in rotating fields may adversely affect the efficiency of a conventional rotating induction apparatus, lowering torque and increasing current flow.

SUMMARY OF THE INVENTION

From the foregoing, it may be appreciated that a need has arisen for a rotating induction apparatus that is tolerant of harmonics.

In accordance with an embodiment of the present invention, a rotating induction apparatus comprises: an inverter system that outputs a number of phases, wherein the number is more than three; a stator comprising a plurality of slots and full span concentrated windings, wherein the windings are electrically coupled to the inverter system; a rotor electromagnetically coupled to a magnetic field generated by the stator; and a signal generator generating a drive waveform signal, the drive waveform signal having a fundamental frequency, wherein the drive waveform signal drives the inverter system, and further wherein a pulsing frequency of the drive waveform signal is in fixed phase relation to the fundamental frequency.

In accordance with another embodiment of the present invention, a rotating induction apparatus comprises: an inverter system that outputs two or more phases; a stator comprising a plurality of slots and full span concentrated windings, wherein the windings are electrically coupled to the inverter system; a rotor electromagnetically coupled to a magnetic field generated by the stator; and a signal generator generating a drive waveform signal, wherein the drive waveform signal drives the inverter system and the drive waveform signal is fed to the inverter system through at least one signal delay device.

In accordance with still another embodiment of the present invention, a rotating induction apparatus comprises: an inverter system that outputs more than three phases; a stator comprising a plurality of slots and full span concentrated windings, wherein the windings are electrically coupled to the inverter system; a rotor electromagnetically coupled to a magnetic field generated by the stator; and whereby the inverter system comprises at least one module, wherein the at least one module comprises an inverter.

In accordance with a further embodiment of the present invention, a rotating induction apparatus comprises: an inverter system that outputs at least six phases, wherein the number of phases is a multiple of three; a stator comprising a plurality of slots and full span concentrated windings, wherein the windings are electrically coupled to the inverter system; a rotor electromagnetically coupled to a magnetic field generated by the stator; and whereby the windings are grouped into a plurality of three phase groups, wherein the plurality of three phrase groups is equivalent to the number of phases divided by three.

In accordance with still yet another embodiment of the present invention, a rotating induction apparatus comprises: an inverter system that outputs a number of phases, wherein the number of phases is more than three, the inverter system comprising a number of half bridge inverters equivalent to the number of phases; a stator comprising a plurality of slots and full span concentrated windings, wherein the windings are electrically coupled to the inverter system, wherein half of the windings are driven and the other half of the windings are connected to a star point; a rotor electromagnetically coupled to a magnetic field generated by the stator; and whereby the driven windings are arranged in at least one set of an odd integer number of windings, wherein the odd integer number of windings is the largest odd integer that divides into the number of phases evenly and divides into 360 evenly.

In accordance with still a further embodiment of the present invention, a rotating induction apparatus comprises: an amplifier that generates an alternating current having twelve phases or greater; a stator comprising a plurality of slots and full span concentrated windings, wherein the windings are electrically coupled to the amplifier; and a rotor electromagnetically coupled to a magnetic field generated by the stator.

In accordance with yet a further embodiment of the present invention, a method of operating an electrical rotating apparatus comprises: providing an inverter system that outputs more than three phases; electrically coupling full span concentrated windings of a stator to the inverter system; electromagnetically coupling a rotor to a magnetic field generated by the stator; generating a drive waveform signal from a signal generator; and driving the inverter system with the drive waveform signal, wherein the drive waveform signal has a fundamental frequency, and further wherein a pulsing frequency of the drive waveform signal is in fixed phase relation to the fundamental frequency.

In accordance with another embodiment of the present invention, a method of operating an electrical rotating apparatus comprises: providing an inverter system that outputs three or more phases; electrically coupling full span concentrated windings of a stator to the inverter system; electromagnetically coupling a rotor to a magnetic field generated by the stator; generating a drive waveform signal from a signal generator; feeding the drive waveform signal through at least one signal delay device; and feeding a signal output from the at least one signal delay device to the inverter system.

A technical advantage of the present invention is that it substantially reduces the problems associated with harmonic rotating fields. Another technical advantage of the present invention is that it may employ pulse width modulated signals (PWM). Further, utilizing certain frequencies of the PWM may provide improved apparatus performance.

A further technical advantage is that a single drive waveform signal may be employed to drive all inverters, as opposed to employing multiple, independent drive waveform signals.

Yet another technical advantage is that the present invention facilitates operation in the non-linear region of the saturation curve, or operation at densities greater than about 130,000 lines per square inch (2.02 Tesla). Because the torque varies as the square of the magnetic field strength, operation at high saturation levels substantially increases available torque and motor performance during starting.

Still another technical advantage of the present invention is that it may beneficially use non-sinusoidal drive waveforms produced by slow switching elements. The inverter may also use flexible component sizes, and, therefore, facilitate cheaper per unit capacity power semiconductors.

Other technical advantages of the present invention are set forth in or will be apparent from drawings and the description of the invention which follows, or may be learned from the practice of the invention.

BRIEF DESCRIPTION OF THE DRAWINGS

For a more complete explanation of the present invention and the technical advantages thereof, reference is now made to the following description and the accompanying drawings, wherein like reference numerals represent like parts, in which.

DETAILED DESCRIPTION OF THE INVENTION

Figure 1:
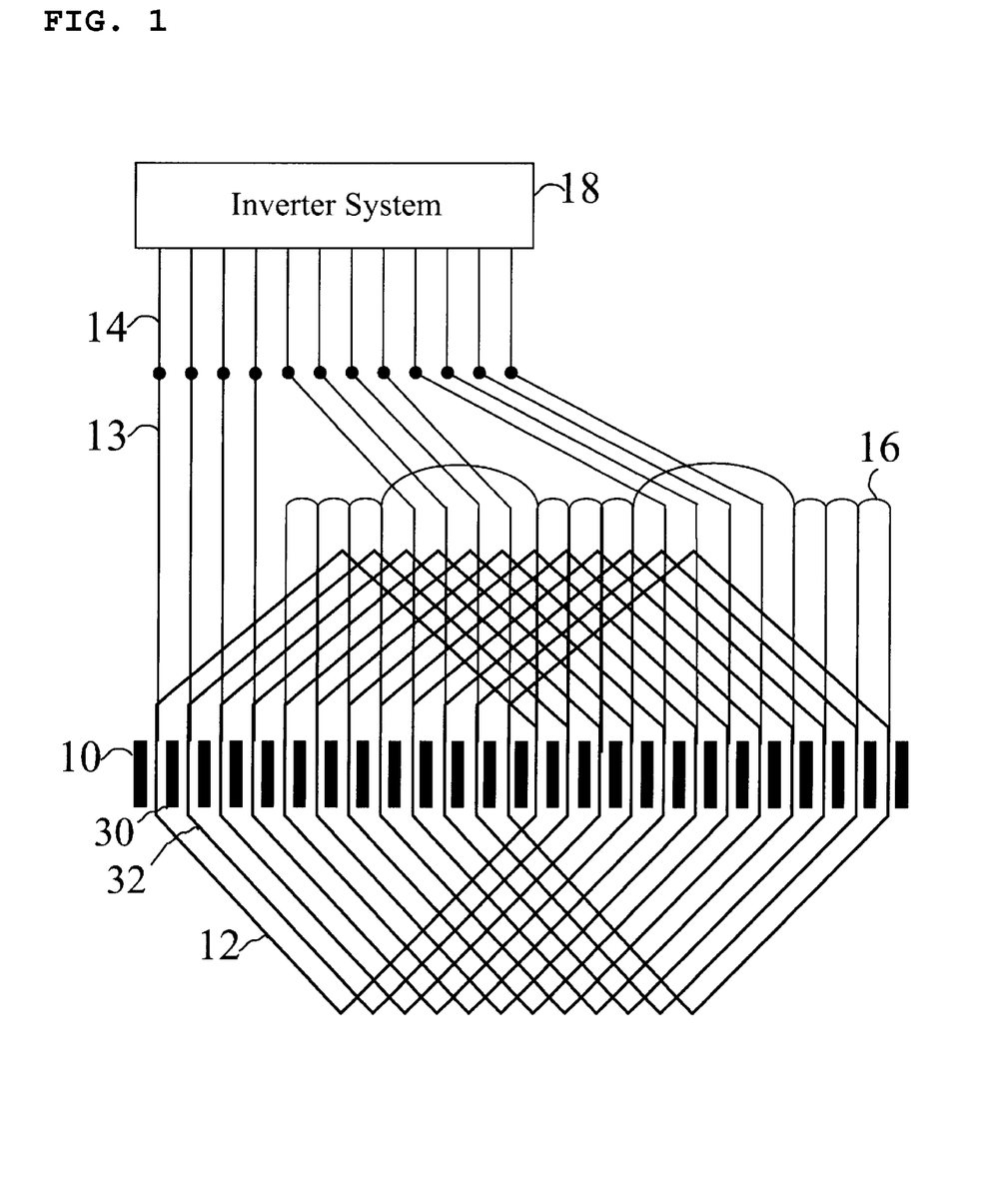
FIG. 1 illustrates a schematic of the windings of an induction apparatus of the present invention.

Embodiments of the present invention and their technical advantages may be better understood by referring to FIGS. 1 though 4, like numerals referring to like and corresponding parts of the various drawings.

The present invention may utilize multiple, i.e., more than three, independently driven phases. Preferably, the apparatus uses twelve or more phases. Alternatively, the apparatus uses eighteen or more phases. The present invention may be constructed on a standard induction motor frame. Further, the embodiments of the present invention that utilize signal delay devices or modules are applicable with three or more phases.

FIG. 1 illustrates a schematic of the windings of an induction apparatus of the present invention. FIG. 1 depicts a stator 10 and inverter system 18. Inverter system 18, depicted in FIG. 1, uses half bridge inverters, however, the present invention may utilize either half or full bridge inverters. Stator 10 includes stator teeth 30 and slots 32. Coils 12 pass through slots 32.

Inverter system 18 is comprised of a plurality of inverters, such that the number of inverters is equal to the number of phases desired. If inverter system 18 uses half bridge inverters, one winding end of each coil 12 is coupled to coil end lead 13 and is in turn coupled to lead 14. Lead 14 is coupled to an inverter in inverter system 18. The other winding end of each coil 12 is coupled to a star point 16. Each coil thus has a driven end, which is the end that is coupled to the inverter system, and a back end, which is the end that is coupled to star point 16.

If a full bridge system was being used, each end of coil 12 would be coupled to a coil end lead 13, and none of the coils would be connected to a star point 16.

When using a star point 16, or a neutral point, the number of half bridges is halved. To accomplish this in the present invention, each winding has two ends or terminations. Rather than connecting an inverter to each end and driving the ends with 180 degree phase difference, an inverter is connected to one winding end 13, and the other winding end is connected to star point 16. When the net current at star point 16 is zero, the voltage at star point 16 will be constant, and the winding will be energized properly.

To achieve the state in which net current at star point 16 is zero, the driven winding ends may be selected to have electrical angles that either divide 360 degrees evenly, or be selected in independent subsets which divide 360 degrees evenly. For example, with a twenty-four slot stator spanning slots 1:13, twenty-four coil ends may be used, with coil ends (driven ends) 1, 2, 4, 7, 9, 10, 12, 15, 11, 18, 20, and 23 connected to a twelve phase inverter via leads and coil ends (back ends) 3, 5, 6, 8, 11, 13, 14, 16, 19, 21, 22, and 24 connected to a star point.

The selected driven winding ends are fed with current with a phase difference that matches the electrical angles of the windings. It is noted that the electrical angle between any two windings in the stator matches the electrical phase angle between the AC power supplying those windings the electrical phase angle is the time offset in the drive waveform between different phases, measured in degrees relative to a full cycle of the drive waveform. The electrical angle is the actual physical angle of the winding, relative to a complete cycle (zero to North to zero to South to zero) of the magnetic field. For example, in a two pole apparatus, the electrical angle is the actual physical angle. For a four pole stator, there are two magnetic cycles around the physical stator, thus the electrical angle is twice the physical angle. For a six pole stator, there are three magnetic cycles, thus, the electrical angle is thrice the physical angle. Accordingly, for a 2N pole stator, the electrical angle spanned is, N multiplied by the physical angle. Having the electrical phase angle of the supplied alternating current match the electrical angle of the winding provides proper high phase order drive for the stator winding.

In addition to dividing 360 degrees evenly, the selected winding sets may contain an odd number of phases. If an even number of phases is selected, the pairs of phases have a 180 degree phase difference; such pairs of phases then are single phases driven by a full bridge, which eliminates the benefit of star point 16. For example, with a 30 slot stator having 15 windings each spanning 180 degrees or opposing slots, the electrical angle between each slot is 12 degrees. Because there are 30 winding ends, each set of winding ends may be driven 24 degrees apart, which evenly divides the full 360 degrees, resulting in a symmetric drive with zero net current at star point 16.

Alternatively, for a 30 slot stator, 5 subsets of 3 windings each, may be used, with each of the winding ends being 120 degrees apart. Each subset is symmetrically driven, so that the 5 subsets together also are symmetrically driven. Any arrangement of these 5 subsets would be symmetrically driven, even if there is not regular, or irregular, angular spacing between the subsets.

The term "winding" may include a single stator conductor extending the length of a single slot. To use coiled windings which encompasses two slots, such windings consist of wires that travel down one slot, around a stator end, up another slot, and then again around the stator end back to the first slot. When current is flowing in one direction through one slot, it is flowing in the opposite direction through the other slot. Considering the two slots independently, the two sides of the winding are driven with AC which is exactly 180° out of phase. Thus, any stator which makes use of windings of at least a single turn has pairs of slots which are 180 electrical degrees apart. Opposite halves or the same winding are placed in magnetically opposite slots, i.e., slots that are 180 electrical degrees apart.

Figure 2:
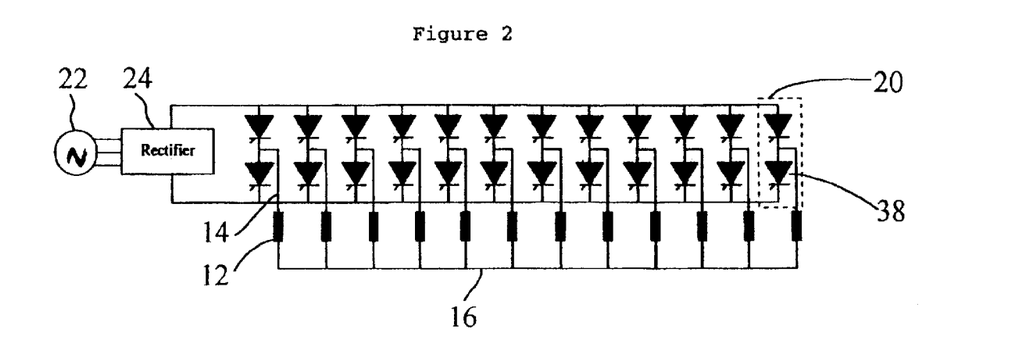
FIG. 2 illustrates a schematic of a twelve phase DC link inverter drive system using half bridge drive for each phase.

FIG. 2 illustrates a schematic of a twelve phase DC link inverter drive system using half bridge drive for each phase. An AC power supply 22 supplies a rectifier 24. Rectifier 24 supplies DC power to half bridges 20. Each half bridge 20 includes two controlled switches 38. Controlled switches 38 may, for example, be transistors. The apparatus depicted in FIG. 2 depicts twelve half brides 20; the dashed outline of half bridge 20 is omitted from all but the last inverter for purposes of simplifying the figure.

A twelve phase DC link inverter drive system is depicted; thus there are twelve half bridges 20. Half bridges 20 alternately switch their output between the positive and negative DC supply. This synthesizes an alternating current output. The alternating current output is fed, via leads 14, to windings 12.

The DC voltage used in the inverter system is known as the DC rail voltage. In comparison with a full bridge system, a half bridge inverter system uses half the number of transistors, and, for the same DC rail voltage, applies half the voltage to each winding. Thus, in comparison with a halt bridge system, a full bridge inverter system uses twice the number of transistors, and, for the same DC rail voltage, applies twice the voltage to each winding.

Further, the half bridge drive may use various symmetries. For example, windings may be grouped in balanced three phase sets. A full bridge system does not need this symmetry, because the full bridge system is intrinsically symmetric. Moreover, the full bridge system places the full DC rail voltage on the windings, which results in the same current flow delivering twice the power to the windings, in comparison with the half bridge.

The present invention may be configured with either full or half bridge inverters depending on cost concerns. For example, if smaller, less expensive and less powerful transistors are desired, full bridge inverters may be used. However, if it is more cost effective to use half the number of more powerful transistors, than half bridge inverters may be more economical to use.

Figure 3:
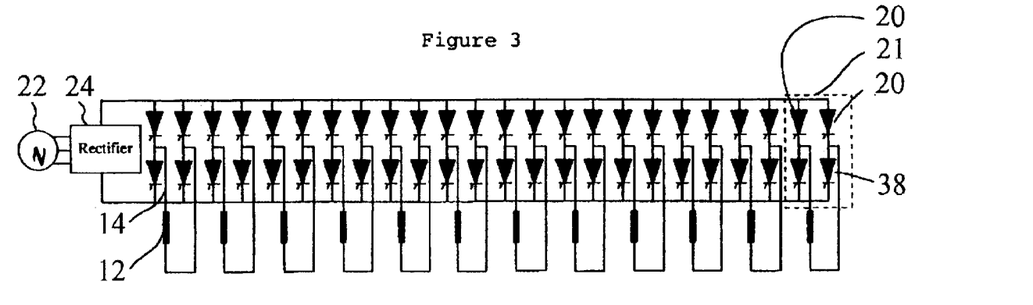
FIG. 3 illustrates a schematic of a twelve phase DC link inverter drive system using full bridge drive for each phase.

FIG. 3 illustrates a schematic of a twelve phase DC link inverter drive system using full bridge drive for each phase. In this example, two half bridge 20 elements, each including two controlled switches 38, act together as a single full bridge element 21. Further, in this example, a twelve phase DC link inverter drive system is depicted, thus there are twelve full bridges 21. The present invention includes greater than three phases, and would have a number of full bridges 21 equal to the number of windings. Because a full bridge is comprised of two half bridges, and each winding has a half bridge at each end, the number of half bridges used with a full bridge system is equal to twice the number of phases. Further, the apparatus depicted in FIG. 3 depicts twelve full bride inverters 21; the dashed outline of full bridge 21 is omitted from the all but the last full bridge inverter to simplify the figure.

Full bridges 21 supply AC power to both ends of winding 12. Thus, using full bridges 21 doubles the power handling capacity of the device, and removes the need for a star point.

Refereeing again to FIG. 1, stator 10 of the present invention may include a number of features. For example, stator 10 may include pole/phase groups which utilize a single slot. A pole/phase group is the winding that comprise one phase in one pole. Further, stator 10 may include a grinding distribution factor of 1, or about 1, wherein the windings are distributed across the width of a single slot.

Moreover, full span windings is used in stator 10. A full span winding is a winding which stretches across 180 electrical degrees of the stator, and thus maximally interacts with the rotating field. Full span winding provides a chording factor of 1, or about 1. Such windings include a single coil in a single slot pair. Therefore, the full phase voltage is applied to a single coil, necessitating high turn counts such as with a parallel connected three phase apparatus. Consequently, each phase carries a fraction of the entire supply current. Further, the phase angle for any phase depends on the electrical angle of the phase winding associated with the phase.

Thus, in general, the present invention includes multiple phase windings with full phase voltage, or a large fraction thereof, applied to each coil. Full pitch windings may also be used, and in general, adjacent coils do not have to be connected together to form phase bands (pole/phase groups).

In three phase designs, the phase angle between adjacent phases is 120°, with phase belts (phase bands) being placed 120° electrical degrees apart in the stator winding. In the present invention, the phase angle of the alternating current supplied by a given inverter output phase is arbitrary, and defined by the inverter control system. The phase angle between the alternating current supplied to any two phases is simply made to be equal to the electrical angle between the coils driven by the phases. This electrical angle need not subdivide the stator evenly.

For example, a twelve phase, two pole apparatus may be constructed in a twenty-four slot stator by winding twelve full span windings. A full span winding has a 1 to 13 pitch on a twenty-four slot stator. Each coil is 15° electrical degrees apart. Thus, the phase angle of the current supplied by each phase of the inverter system is 15° apart. Such a configuration is preferable if push-pull inverters are used which were connected to both sides of each phase coil. Consequently, the phase angle between phase twelve and phase one is 165°. This is acceptable because electrical locations 180° to 345° are the back sides of the driven coils.

Half bridges also may be used with star connected windings. A balanced drive configuration may be achieved by driving the coil ends at slots 1, 2, 4, 7, 9, 10, 12, 15, 17, 18, 20, and 23 and star connecting the other coil ends. In this configuration the phase angles between phase 1 driving the coil end at slot one are: 0°, 15°, 45°, 90°, 120°, 135°, 165°, 210°, 240°, 255°, 285°, and 330°. Despite the uneven phase angles, the motor will be driven smoothly.

Thus, the phase angle of the alternating current used to supply each phase may be matched to the electrical angle of each phase winding within the motor. Symmetry, in terms of the vector sum of all phase angles, is utilized because of the star connection to the inverter drive system. However, phases need not be evenly spaced throughout the stator.

Moreover, the stator windings may be grouped into a plurality of three phase groups. These three phase groups may be driven by conventional three phase control electronics, and may be shut off as a unit in the event of a localized failure. By shutting down individual three phase units, drive balance is maintained, and the apparatus is easier to repair. Further, the apparatus is easy to operate because it is set up as a plurality of three-phase unit groups.

Flux per pole is the total magnetic current flowing through each North or South pole. The magnetic flux is produced by the currents flowing in the stator windings and is determined by the following relationship:

$$\text{Flux/pole} = \frac{22,500,000 \times \text{coil voltage}}{\text{frequency} \times \text{turns/coil} \times K_d \times K_s}$$

(where flux per pole is given in lines of force [$10^{-8}$ Webers], coil voltage is in volts RMS, frequency is in Hertz, $K_d$ is the winding distribution factor [which in the present invention is about 1], and $K_s$ is the winding chord factor [which in the present invention is about 1]). For a two pole machine with a single coil per phase, phase voltage and coil voltage will be the same. For higher pole counts, windings of corresponding phase may be interconnected in either series or parallel configuration, as in conventional three phase machines, thus phase voltage may be different from coil voltage.

A maximum flux per pole is selected based upon stator size, air gap size, and saturation considerations. Phase voltage is selected based upon inverter design considerations. As the present invention constructively uses harmonics, saturation of the stator iron into the non-linear region of the saturation curve may be used.

The present invention further includes an inverter system. For example, the inverter system may be a variable voltage, variable frequency inverter system. The present invention may use a number of inverters within the inverter system. The number of inverters is equal to the number of phases desired.

The present apparatus nay also utilize a feedback system. The feedback system uses a controller frequency and a voltage which are both adjusted in response to the desired operation of the rotating apparatus and to the actual measured operation. For example, if the measured speed were below, a programmed Speed, the feedback control system may increase the frequency of the AC drive. The capability of such a feedback system is enhanced by the greater torque capability of the present invention.

In the apparatus of the present invention, stator windings, and consequently electrical phase angles, are not necessarily evenly distributed. Further, push-pull inverter legs may be used to drive both sides of each phase. Additionally, high switching frequencies are not necessary. Alternatively, a single square wave pulse per half cycle, which is low speed switching, also may be used. Moreover, as many inverters are effectively operating in parallel, the apparatus of the present invention provides improved fault tolerance.

The inverters in the inverter system generate alternating current. Each inverter half-bridge generates a single phase of AC. All of the inverters generate AC of the same voltage and frequency; the difference between the phases is a time difference. A sine wave may be described by its amplitude, its frequency, and its offset (e.g., where it crosses zero or starts). The inverters are generating AC where the cycles start at different points in time. The time difference may be described in terms of the total duration of a single AC cycle, in a fashion similar to describing the number of PWM pulses per AC cycle. A full AC cycle has a duration of 360 degrees, and the time difference between two different AC waveforms of the same frequency and amplitude is measured in degrees.

The present invention may be applied to a standard squirrel cage induction motor frame, e.g., an induction motor in which the secondary circuit consists of a squirrel-cage winding arranged in slots in the core. In this machine, the region of interaction between the stator and the rotor may be considered the surface of a cylinder. Rotation is about the axis of the cylinder, lines of magnetic flux pass radially through the cylinder surface, and current flowing in both the stator and the rotor conductors is parallel to the axis of the cylinder. The present invention may also be applied to pancake motors or other axial flux apparatus. The region of interaction, or air gap, is the surface of a disk. Rotation is about the axis of the disk, lines of magnetic flux pass axially through the disk surface, and current flows radially in both the stator and the rotor. Moreover, several rotors and stators may be stacked.

In the present invention, output torque capability of the apparatus increases as the square of the flux density. Therefore, it is advantageous to increase the design flux density. In a conventional three phase apparatus, increased flux density would produce harmonic losses; however this is not the case with the present invention. In the present invention, harmonic rotating fields generated by non-linear saturation effects, rotate in synchronism with the fundamental rotating field. This allows the present invention to operate in the non-linear region of the saturation curve, where the saturation curve is the relation between the applied magnetic induction and the resultant magnetic field.

In the present invention, flux densities of at least 150,000 lines per square inch (2.33 Tesla) may be used. Further, the present invention may also be used at conventional flux densities (of about 110,000 to 130,000 lines per square inch or 1.71 to 2.02 Tesla) while being used in over voltage operation for short period overloads, i.e., operating at flux densities above conventional flux densities for short periods of time. The maximum torque capabilities may be increased by at least about 200% through the use of high flux densities. For example, given a conventional induction apparatus frame and rotor, with peak torque of 250% of nominal rated torque, the method of the present invention may be applied to the same frame and rotor, enabling a peak torque of 500% nominal rated torque, for short periods of time limited by motor heating.

With a twelve phase two pole apparatus of the present invention, a phase angle of fifteen degrees between adjacent phases is used. However, if a phase angle of forty-five degrees is employed, then the apparatus operates as a six pole apparatus. The maximum pole count, which may be used, is equal to the number of stator slots. In general, to change the pole count, the phase angle of the drive waveform signal is increased by odd integral multiples, which in turn increases the pole count of the magnetic field by the same amount of odd integral multiples. If half turn windings are used, then even integral changes in pole count may be made, however, if full turn windings are used, then an even pole count change places opposite winding halves at the same electrical angle. The use of high pole counts may be beneficial when the present invention is operated at high saturation levels.

Further, pole changing capability may be used to reduce stator saturation when operating at high saturation levels. It should be noted that any winding symmetries necessitated by the coil form or star point neutrality used should be maintained for alternative pole counts. In this respect, the full bridge drive is more flexible than the half bridge drive because the symmetry does not have to be changed.

Figure 4:
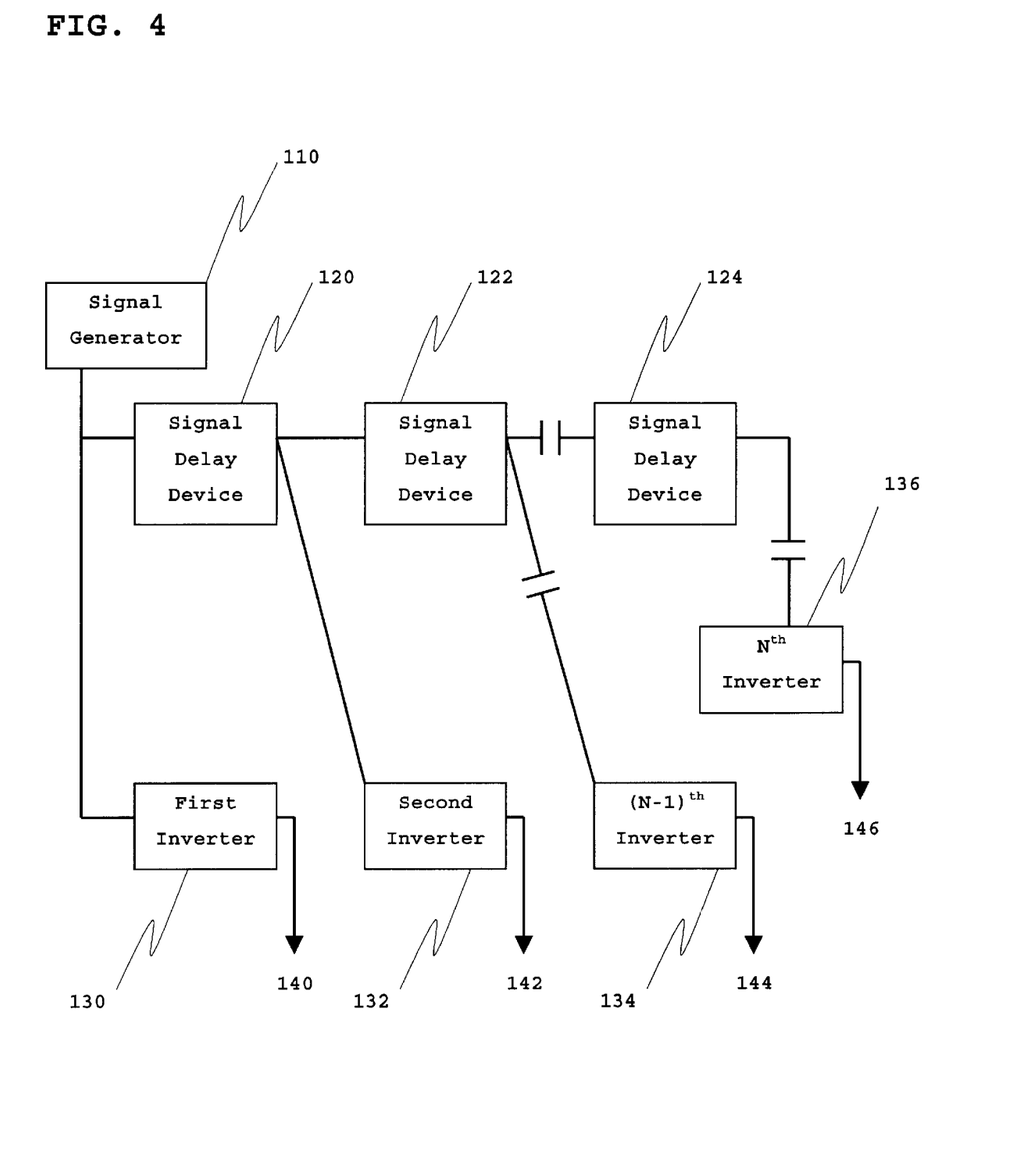
FIG. 4 illustrates a schematic of a delay device based controller for the inverter system of the present invention.

The inverter system used in the present invention may be comprised of a number of individual inverters that are powered by multiple drive waveform signals. Alternatively, the inverters may be supplied by one drive waveform signal, as depicted in FIG. 4. The drive waveform signal is the command signal for the inverters.

FIG. 4 illustrates a schematic of a delay device based controller for the inverter system of the present invention. The delay device based controller comprises inverters, a signal generator 110, and signal delay devices 120. Signal generator 110 produces a representation of the desired drive waveform signal. The drive waveform signal may be a PWM square wave, however, analog representations or digital numeric representations, or other signal modulation schemes may be used. The representation of the desired drive waveform signal is coupled directly to an inverter 130 and to a signal delay device 120. The output 140 of inverter 130 is a single phase used to drive the rotating machine of the present invention. The output of signal delay device 120 is connected to a second inverter 132 and to a second signal delay device 122. The output 142 of inverter 132 is a single phase used to drive the rotating machine of the present invention, offset in time by signal delay device 120. The delay time of signal delay device 120 is selected to equal the desired phase angle delay at the drive waveform frequency. Further delay devices and inverters are added until the necessary inverter count is reached. For example, in a system with n inverters, a previously offset signal is sent to both signal delay device 124 and $(n-1)^{th}$ inverter 134, which outputs 144, and the output of signal delay device 124 is then fed into the $n^{th}$ inverter 136, which outputs 146.

The controller described herein, which uses signal delay devices, may be used with a rotating induction apparatus having two phases or more. To use this controller with a three phase system, two signal delay devices are used, each providing a delay of 120°. Further, the drive waveform signal may be analog or digital. Moreover, the signal delay device may be an analog or digital signal delay device.

The time delay of the signal delay devices matches the desired phase angle. For fixed delay signal delay devices, this results in a fixed frequency operation. However, signal delay devices may be clock based; for example shift registers and circular memories, as well as bucket brigade devices and switched capacitor signal delay lines. For these devices, the shift clock may be supplied by the some clock used for waveform synthesis, such as a main system clock. Alternatively, the signal delay devices may use a separate clock. Alternatively still, the clock signal used by the signal delay devices may be generated by the signal generator. When the clock is tied to both the signal generator and the signal delay devices, the drive frequency may be simply changed by altering the frequency of this clock. This clock need not be regular, and may be modulated between pulses to simplify output voltage control. Further, the clock does not need to have a fixed frequency. Additionally, speed changes made be implemented instantly by altering the clock used by the signal delay device.

While the number of signal delay devices depicted FIG. 4 is one less than the number of phases, various symmetries may be exploited to simplify the delay logic such as an inversion. A delay of 180° is simply an inversion. Thus, delays of greater then 180° may be considered an inversion plus a suitable delay less than 180°. For example, with an even number of phases, the number of signal delay devices may be reduced by a factor of two because the inversions of the delayed signals from 0° to 180° produce similar results for 180° to 360°. For the fundamental and all odd harmonics, an inversion is equal to a delay of 180°. For all even harmonics, an inversion is equal to a delay of 360°. Thus, inversions operate most effectively where odd harmonics predominate.

Another example of a beneficial symmetry when using a full bridge inverter, is by inverting each signal. This may be accomplished by having a signal fed directly into one half bridge, and an inversion of that signal be fed into the other half bridge. Thus, half the signal delay devices are used to drive all of the half bridges.

Additionally, various three phase control microprocessors may be used by the present invention, which synthesize three phases of PWM output. These three outputs may be used to drive three (or six, if using full bridge) inverters in a three phase set, and the three phase signals may be fed through suitable delay devices to further three phase sets.

The signal delay device may be any device capable of delaying the inputted drive waveform signal. For example the signal delay device may be any first-in-first-out (FIFO) buffer, such as a shift register, circular memory, bucket brigade, acoustic delay line, optical delay line, mercury delay line, surface acoustic wave (SAW) delay line, inductor capacitor (LC) delay line, a liner group delay all pass filter, a wave guide, or the like.

Alternatively, one signal delay device may be used, such that the signal delay device is able to handle multiple shifts, such as a multiple tap shift register. For example, when using 1024 bits per phase, an 18,432 bit shift register with 18 taps each 1024 bits apart may be used. Further, because numerous delays of the same length may be used, conventional parallel memory addressed in a circular fashion may also be useful.

Alternatively, the signal generator may generate a drive waveform signal that feeds a number of signal delay devices that are in parallel. This is accomplished by copying the drive waveform signal once for each inverter. All of the copies are then sent to a bank of signal delay devices. Each signal delay device may be set to create a delay that generates a different phase, For example, for nine phases, the first signal delay device may create the delay of 40°, the second signal delay device may create a delay of 80°, and so on up until all phases are created. The signal for 0° may come directly from the signal generator, as no delay is needed in that signal.

Using a signal delay device is advantageous because one signal may be used to operate any number of phases. The one signal is simply offset the appropriate amount of time for the number of phases in the apparatus, where time is measured as an angle relative to a full cycle. For example, if 15 phases were used with half bridges, then the signal may go through 14 signal delay devices that offset each signal by 24° from the previous signal.

It the number of desired phases is changed, instead, of having to create a large set of new signals, the delay from the signal delay devices could just be adjusted; by adding new phase drive electronics and adjusting the number of total bits per cycle of the AC the delay angle represented by a fixed delay length is changed to match the new number of phases. For example, with a digital signal and eighteen phases using half bridges the bit stream of the drive waveform signal is 36,864 bits (36×1024). Again, because half is used, 36,864/36=1024 bit represents a 10° phase difference. Additionally, inversion may be used; a delay line of half the length may be used to span one half of the delay needed, with the other half being supplied by inversions.

The apparatus of the present invention also may be of modular construction. This is another method of allowing the apparatus to easily adjust to a different motor having a different number of phases. The apparatus may be made modular by placing a half bridge or full bridge drive, whichever was being used, in a module. The number of modules needed for any particular apparatus is determined by the number of phases. For example, when changing from a system of 9 phases to 15 phases, 6 modules are added to the apparatus. Accordingly, by providing modular construction, one controller and multiple modules may be used on various motors with different phases. Moreover, the modularity allows easier maintenance of the apparatus.

Further, signal delay devices also may be included in the modules. Therefore, each module may include a half bridge and a signal delay device to carry the signal to the next half bride in the apparatus. The signal generator then may be connected to the same number of modules as are number of phases in the apparatus. The signal generator is programmed with the number of modules, the total delay, and any other information that the signal generator deemed necessary to create the drive waveform signal. Regardless, the signal generator still may use just two relevant outputs: (i) the bit stream comprising the drive waveform signal; and (ii) the delay line clock to control the length of the delays.

If using signal delay devices in the module, the controller may accommodate the difference in delays from the different phases in various apparatus by adjusting the length of the representation of the input drive waveform signal. For example, with a digital signal, the apparatus may be programed to shift 1024 bits ($2^{10}$) for every phase. For a 9 phase apparatus, the length of the input drive waveform signal may be 9,216 bits (9×1024). It a 15 phase apparatus was used, the length of the input drive waveform signal simply may be increased to 15,360 bits (15×1024). Thus, regardless of the number of phases, 1024 bits are shifted, which is equivalent to one phase for each phase shift. Further, the hardware need not be adjusted as the drive waveform signal may be altered via software or by the signal generator that creates the input drive waveform signal. Alternatively, the input drive waveform signal may be based on any other amount of bits other than 1024, however, 1024 bits is preferred because it provides enough data for adequate voltage resolution and is easy for the signal delay devices to utilize. While the voltage resolution depends on the length of the drive waveform signal compared to the number of pulses per AC cycle, when the length is equal to twice the number of pulses per AC cycle, the voltage resolution is about 0.1%. Thus, 1024 bits provides a desired voltage resolution for all practical pulses per AC cycle.

Figure 5:
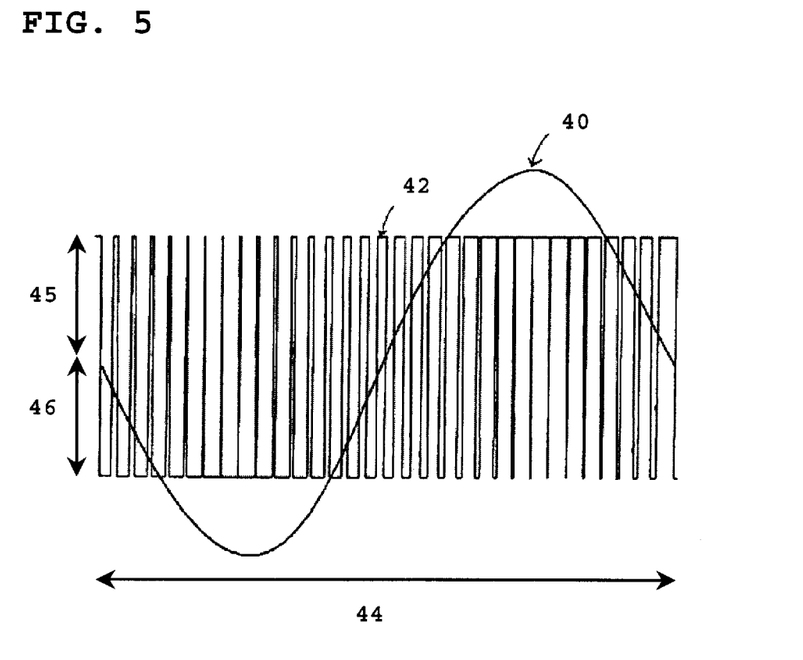
FIG. 5 illustrates the formation of a drive waveform signal.

Additionally, the present invention may utilize a PWM as the drive waveform signal. Referring now to FIG. 5, a desired drive waveform having a fundamental frequency 40 is approximated by a duty cycle modulated square wave 42 (the pulsing frequency). The desired drive waveform may be described in terms of amplitude, frequency, and phase. The duty cycle modulated square wave may be described in terms of switching or PWM period 44, positive amplitude 45 and negative amplitude 46. The synthesized PWM output voltage waveform produces current through motor windings, which closely approximates that which would have been produced by the desired output waveform. A microcontroller system used with three phase motors may be used, under software control, to develop the PWM control signals for each of the three inverter phase outputs. Further, by adding additional output subroutines and using additional output lines, a three phase microcontroller may be used to control all of phase outputs in the present invention.

The pulsing frequency of the PWM is specified in pulses per AC cycle. Alternatively, the pulsing frequency of the PWM may be in pulses per radian, however, that is converted to pulses per AC cycle by multiplying the pulses per radian by 2n. Nevertheless, the pulsing frequency of the PWM, as used herein, is in pulses per AC cycle.

The PWM waveform is modulated to obtain an approximation of a desired sine wave. The frequency of that desired sine wave is the fundamental frequency.

Figure 6:
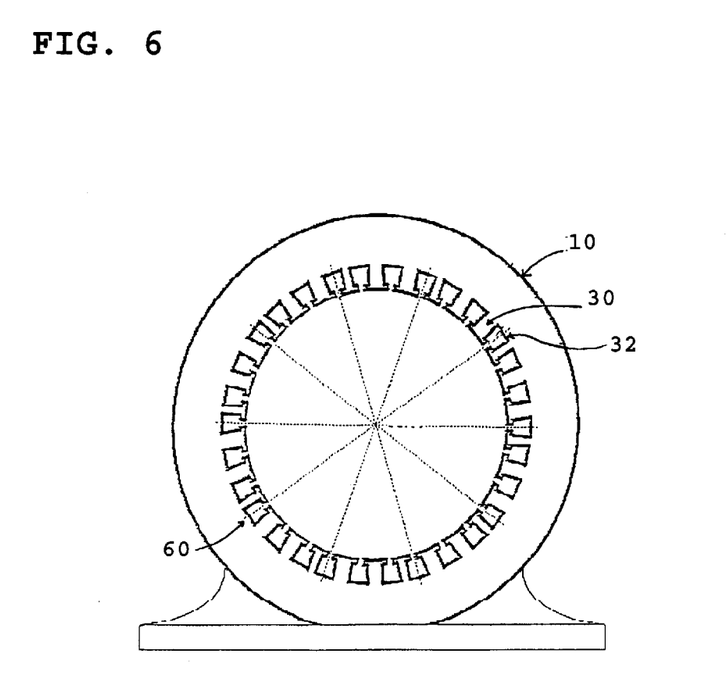
FIG. 6 illustrates a schematic of a motor stator with irregularly-spaced windings.

There are various conditions that may affect the PWM's effect on the apparatus. For example, there may be regular spaced windings or irregular spaced windings. Referring now to FIG. 6 the locations of the stator slots 32 need not be regularly spaced. In FIG. 6, the stator has 30 slots, for a 15 phase system. The 30 slots are arranged as 15 slot pairs 32 and 60, each slot pair carrying a single phase winding. The 15 slot pairs 32 and 60 are arranged as 3 sets of 5 slot pairs. Each set of 5 slot pairs is symmetrically arranged to provide for balanced drive. The 3 sets of 5 slot pairs are not evenly spaced. Other conditions that may affect the apparatus include: (i) the PWM may be in fixed phase relation to the fundamental frequency or not be in fixed phase relation to the fundamental frequency; (ii) the PWM may be regular or irregular; or (iii) the PWM may have a frequency above or below the phase count. An alternating current having harmonics in fixed phase relation to the fundamental frequency means that all of the harmonics in all of the phases of the alternating current have the same time relation to the fundamental frequency driving each phase. This means that the shape of the drive waveform is the same going into each phase.

While in a three phase system, PWM torques are always adverse, in the present invention these torques maybe either beneficially used or negated. For example, when the PWM waveform is in fixed phase relation to the fundamental and is an even multiple of the phase count, such as twice the phase count, with the windings being regularly spaced, the harmonic currents do not enter the apparatus. Thus, having the PWM waveform in fixed phase relation to the fundamental and twice the phase count is advantageous, for one reason, because no additional noise is created by the harmonics.

When the pulsing frequency is less than the number of phases in the apparatus, then the harmonics created from the pulsing cause additional currents to flow into the apparatus. When current flows into the apparatus under this condition in the present invention, the harmonic rotating fields created by pulsing currents are synchronized with the fundamental frequency. This results in additional torque being created. However, this additional torque is beneficial in that it is applied in the direction and speed that the motor is turning. Therefore, when the pulsing frequency is in fixed phased relation with the fundamental frequency, and is less than the number of phases in the apparatus, the efficiency of the apparatus is improved and the current noise is significantly reduced.

Further, when the PWM waveform is not in fixed phase relation to the fundamental, this produces a non-beneficial rotating field. However, the PWM may be at a high enough frequency that the rotating field produced may be small and may have no noticeable effect on the apparatus. Nevertheless, the effects are noticeable when the PWM is at a slow frequency.

Moreover, the PWM may be a square wave, such that the inverters are driven by a single positive and a single negative pulse for each desired fundamental cycle. The square wave may be, for example, a full square wave or a duty cycle modulated square wave. Further, the square wave may be a single square wave pulse per half cycle, which is low speed.

As stated above, harmonics that are in fixed phase relation to the fundamental may produce beneficial harmonic rotating fields. A square wave comprises a fundamental sine wave, of the same frequency as the square wave, and various quantities of odd harmonics—with the proportions of the odd harmonics varying depending on the duty cycle of the square wave.

A square wave, however, in comparison to a sine wave, is easy to implement and may be used inexpensively. Because the apparatus of the present invention utilizes harmonics, simple, efficient square wave inverters may be used with the present invention.

In conventional three phase apparatus, to avoid losses due to harmonics, higher switching speeds are used. Conversely, because the transistors that generate square waves may be switched slowly, they produce less electrical noise than with high speed switching. Therefore, the apparatus will be audibly quiet in operation.

The apparatus of the present invention may also be powered by a source of alternating current other than an inverter. For example, the alternating current may be a pure alternating current, a high phase order cycloconverter, or a high phase order generator may also be used. Alternatively, an amplifier may be used to generate the alternating current.

Using alternating current would eliminate the need for inverters or an inverter system. The stator may be powered directly by the alternating current having greater than three phases. This system may then be used with any of the above modifications and maintains the advantages detailed above.

The alternating current used may have more than three phases. Preferably, the alternating current has twelve or more phases. Alternatively, the alternating current has eighteen or more phases.

Force in a rotating induction apparatus is produced by the interaction of rotor currents and the stator magnetic field. For any particular motor design, saturation effects limit the magnetic flux per unit area of interaction between rotor and stator. Because the currents in the rotor are induced by this magnetic flux, saturation effects further limit the current per unit area. Force per unit area is proportional to the product of magnetic flux per unit area and transverse current per unit area; design changes which increase the allowable magnetic saturation will therefore increase the force per unit area.

Force per unit area may therefore be used to compare various rotating induction apparatus designs. However force per unit area is a value which is rarely recorded for such apparatus. Torque values, however, are universally recorded. Torque is the moment of force, that is, torque is the product of force time distance from the axis of rotation. Force per unit area, when multiplied by the total area, and when again multiplied by the distance of that area from the axis of rotation, will provide the total torque. It should be noted that if the radial distance of the air gap is not constant, as in axial flux machines, this calculation will need to be performed as an integral over the total area.

Thus, torque divided by the moment of interaction area may be used as an equivalent to force per unit area. For a radial flux rotating induction apparatus, such as squirrel cage motor or generator, the moment of interaction area is the area of the air gap cylinder multiplied by the radius of said cylinder. Dropping a constant of 2n, this is the same as the equation for the volume of the rotor. Thus for a rotating induction apparatus, torque divided by rotor volume may be used as an equivalent to force per unit area.

The present invention uses torques created by harmonics to more efficiently operate the apparatus. Based on operating at a flux density of 150,000 lines per square inch (2.33 Tesla) the present invention provides an increase of at least 33% in peak torque versus rotor volume for otherwise similar rotating induction apparatus operating at the current conventional maximum of 130,000 lines per square inch (2.02 Tesla). When operating at 200,000 lines per square inch (3.11 Tesla), the present invention provides an increase of at least 137% in peak torque versus rotor volume for otherwise similar rotating induction apparatus operating at the current conventional maximum of 130,000 lines per square inch (2.02 Tesla).

The present invention is also applicable as an electrical generator. To use the present invention as an electrical generator, mechanical power is supplied to the rotor and the source of power to the inverters is modified to consume the power the apparatus is now generating. Any technology used for inverter controlled three phase machines, which provide regenerative breaking capabilities, may also be applied to the present invention.

As mentioned above, when a half bridge drive and a star point connection is used, windings should evenly divide 360 electrical degrees, or evenly divide 360 electrical degrees in subsets. This maintains a net zero current flow in the star point; as much current flows out of the star point and into the windings as into the star point and out of the windings. The star point may be connected to the neutral of the DC supply, in which case any drive imbalance appears as current in this neutral connection. Alternatively, the neutral point may be unconnected, in which imbalance in the drive is evidenced by a varying neutral voltage. Drive imbalance may reduce the effective voltage applied to the windings, or may result in uneven winding heating.

Similar beneficial symmetries may be used for winding position relative to drive waveform harmonic content these symmetries maybe exploited in a number of different ways. As mentioned above, when the drive PWM pulses are in fixed phase relation to the fundamental, and the number of pulses per fundamental cycle are twice the number of phases, then the PWM pulses are a harmonic of the fundamental cycle, yet do not enter the apparatus. This occurs because, relative to the pulsing waveform, the phase angle difference between adjacent phases is equal to 360 degrees, or a multiple of 360 degrees. This means that the same voltage is applied to all phases at the same time. As there is no voltage difference for this harmonic, this harmonic will not flow in the windings.

If it is desired to permit a particular harmonic to flow in the apparatus, then the driven winding ends selected, described in terms of electrical phase angle relative to that harmonic, have a vector sum of zero. As it is desired to use low order harmonics to supply additional torque, driven winding ends should be selected to pass low order harmonics. This occurs when the winding ends selected divide 360 degrees evenly in the largest sets possible, preferably in a single set rather than subsets.

For example, the following are preferred winding end selections for half bridge drive of star connected high phase order windings for various slot counts. The following are listed in terms of angles relative to a reference zero degree phase, which is always a driven phase. Slot counts are relative to each two poles. Thus, for a four pole machine, the slot count is doubled. Similarly, for a 2N pole count machine, slot count is multiplied by N. Phase count is equal to one half the listed slot count. Thus, it is preferable to arrange the driven windings of the stator in the largest sets of numerically odd subsets that evenly divide 360 degrees evenly, with the sets being grouped into three phase sets, in the following electrical angles:

a) For a 9 phase winding [set of nine as three sets of three phases each·: 0°, 120°, 240°, 40°, 160°, 280°, 80°, 200°, and 320°;

b) For a 10 phase winding [two sets of five]: 0°, 18°, 72°, 90°, 144°, 152°, 216°, 234°, 288°, and 306°, c) For a 12 phase winding [four sets of three maximally distributed); 0°, 120°, 240°, 15°, 135°, 255°, 45°, 165°, 285°, 90°, 210°, and 330°;

d) For a 15 phase winding [one set of fifteen as five sets of three phases each]: 0°, 120°, 240°, 24°, 144°, 264°, 48°, 168°, 288°, 72°, 192°, 312°, 96°, 216°, and 336°;

e) For a 18 phase winding [two sets of nine as three sets of three phases each]: 0°, 120°, 240°, 10°, 130°, 250°, 40°, 160°, 280°, 50°, 170°, 290°, 80°, 200°, 320°, 90°, 210°, and 330°;

f) For a 20 phase winding [four sets of five]: 0°, 9°, 27°, 54°, 72°, 81°, 99°, 126°, 144°, 153°, 171°, 198°, 216°, 225°, 243°, 270°, 288°, 297°, 315°, and 342°;

g) For a 24 phase winding (eight sets of three maximally distributed]: 0°, 120°, 240°, 15°, 135°, 255°, 30°, 150°, 270°, 45°, 165°, 285°, 52.5°, 172.5°, 292.5°, 67.5°, 187.5°, 307.5°, 82.5°, 202.5°, 320.5°, 97.5°, 217.5°, and 337.5°;

h) For a 30 phase winding [two sets of fifteen as five sets of three phases each]: 0°, 120°, 240°, 6°, 126°, 246°, 24°, 144°, 264°, 30°, 150°, 270°, 48°, 168°, 288°, 54°, 174°, 294°, 72°, 192°, 312°, 78°, 198°, 318°, 96°, 216°, 336°, 102°, 222°, and 342°; and i) For a 36 phase winding [four sets of nine as three sets of three phases each]: 0°, 120°, 240°, 5°, 125°, 245°, 15°, 135°, 255°, 30°, 150°, 270°, 40°, 160°, 280°, 45°, 165°, 285°, 55°, 175°, 295°, 70°, 190°, 310°, 80°, 200°, 320°, 85°, 205°, 325°, 95°, 215°, 335°, 110°, 230°, and 350°.

Additionally, similar sets may be used with windings of other numbers of phases.

EXAMPLE

The invention may be further clarified by consideration of the following example, which is intended to be purely exemplary of the structure of the invention.

In an example, an 18 phase half bridge drive embodying the present invention had electro-windings with the connections as detailed in Table 1. A motor was custom wound on a standard frame from which the production winding was removed. The frame used was from a two pole, totally enclosed, fan cooled, size 215T apparatus. This apparatus was originally rated at 10 horsepower (8 kW) at 3525 RPM. Internally, the apparatus had a thirty-six slot stator and a squirrel cage rotor with cast aluminum conductors. The apparatus was rewound with a eighteen phase, two pole stator winding with all coil ends brought out to external termination. Coil span was 1 to 19, giving a full span winding, and 50 turns per coil was used.

The inverters used International Rectifier Corporation IR2233 interface chips and were printed circuit and hardwired wrapped units, using Siemens BSM 75GB IGBT transistor modules as the power devices. No provision was made for the DC supply, and a standard laboratory supply was used as the primary DC power source for testing. Six, three phase inverters were used to supply eighteen independent phases to the motor.

Logic control for the inverter systems was provided by a general purpose IBM compatible computer. Eighteen bits of parallel output were used to supply the on/off coding to the IR2233 controller chips. Software running on the computer provided PWM of appropriate phasing to operate the motor. Phase angle was adjustable in order to demonstrate pole changing. Additionally, output wave-form was adjustable.

TABLE 1

| Termination | Slot | Physical Angle | Drive Relation Phase Angle (from reference) |
|---|---|---|---|
| 1 | 1 | 0° | 0° |
| 2 | 19 | 180° | star |
| 3 | 2 | 10° | 10° |
| 4 | 20 | 190° | star |
| 5 | 3 | 20° | 20° |
| 6 | 21 | 200° | star |
| 7 | 4 | 30° | 30° |
| 8 | 22 | 210° | star |
| 9 | 5 | 40° | 40 |
| 10 | 23 | 220° | star |
| 11 | 6 | 500° | 50° |
| 12 | 24 | 230° | star |
| 13 | 7 | 60° | star |
| 14 | 25 | 240° | 240° |
| 15 | 8 | 70° | star |

TABLE 1-continued

| Termination | Slot | Physical Angle | Drive Relation Phase Angle (from reference) |
|---|---|---|---|
| 16 | 26 | 250° | 250° |
| 17 | 9 | 80° | star |
| 18 | 22 | 260° | 260° |

| Termination | Slot | Physical Angle | Drive Relation Phase Angle (from reference) |
|---|---|---|---|
| 19 | 10 | 90° | star |
| 20 | 28 | 270° | 270° |
| 21 | 11 | 100° | star |
| 22 | 29 | 280° | 280° |
| 23 | 12 | 110° | star |
| 24 | 30 | 290° | 290° |
| 25 | 13 | 120° | 120° |
| 26 | 31 | 300° | star |
| 27 | 14 | 130° | 130° |
| 28 | 32 | 310° | star |
| 29 | 15 | 140° | 140° |
| 30 | 33 | 320° | star |
| 31 | 16 | 150° | 150° |
| 32 | 34 | 330° | star |
| 33 | 17 | 160° | 160° |
| 34 | 35 | 340° | star |
| 35 | 18 | 170° | 170° |
| 36 | 36 | 350° | star |

The present invention is applicable to all geometries of the AC induction apparatus. The present invention is further applicable to both squirrel cage and wound rotor apparatus, which includes buried conductors and three phase and high phase order wound rotors.

Additionally, the present invention is also applicable to all different inverter topologies that have been used in the operation of three phase apparatus. These include voltage mode pulse width modulation inverters, which provide an alternating current regulated to a specified RMS voltage, current mode pulse width modulation inverters, which provide an alternating current regulated to a specified RMS current. Further, linear inverters which provide true continuous output, both current mode and voltage mode, may be used. DC link inverters, resonant link inverters, and cycloconverters, all of which are different modes of supplying power to the inverter phase outputs, also may be used. Power factor correction hardware may be used on the power inputs of the inverter drive system, and regeneration capability also may be a functional part of the inverter drive system. Square wave inverters with high harmonic content in the output wave form also may be used. Moreover, push-pull inverters also may be used, doubling the effective voltage capability of the inverter drive system, at the expense of using more active devices.

Further, the present invention is applicable to geometries in which the region of interaction between stator and rotor has circular symmetry about the axis of rotation, magnetic flux is generally normal to the region of interaction, and current slow is generally perpendicular both to flux and the direction of motion. Alternative geometries which may be utilized in the method of the present invention are axial flux, or pancake, motors, radial flux geometries in which the rotor is external to the stator, or geometries which use a combination of axial and radial flux, or multiple axial flux paths. Of particular interest is the latter geometry, wherein a dual-sided pancake stator is surrounded on both faces by pancake rotor.

While this invention has been described with reference to illustrative embodiments, it is to be understood that this description is not intended to be construed in a limiting sense. Modifications to and combinations of the illustrative embodiments will be apparent to persons skilled in the art upon reference to this description. It is to be further understood, therefore, that changes in the details of the embodiments of the present invention and additional embodiments of the present invention will be apparent to persons of ordinary skill in the art having reference to this description. It is contemplated that such changes and additional embodiments are within the spirit and true scope of the invention as claimed below.

What is claimed is:

1. An electrical rotating apparatus comprising:
   a stator comprising a plurality of slots and full span concentrated windings, wherein said windings are irregular spaced windings;
   an inverter system for supplying an output having more than three phases to the windings;
   a signal generator electrically connected to the inverter system, for generating a drive waveform signal;
   wherein the drive waveform signal comprises a a pulsing frequency that is in fixed phase relation to a fundamental frequency.

2. An electrical rotating apparatus comprising:
   a stator comprising a plurality of slots, wherein said plurality of slots are arranged in multiple subsets of three and wherein there is irregular spacing between said subsets, and full span concentrated windings;
   an inverter system for supplying an output having more than three phases to the windings;
   a signal generator electrically connected to the inverter system, for generating a drive waveform signal;
   wherein the drive waveform signal comprises a pulsing frequency that is in fixed phase relation to a fundamental frequency.

3. A method of operating an electrical rotating induction apparatus comprising:
   switching an electrical switching device at a fast rate to generate a drive waveform signal of a desired frequency;
   controlling the switching rate to create a pulsing frequency component to the drive waveform signal in fixed phase relation to the desired frequency;
   delaying the drive waveform signal to provide multiple versions thereof;
   synthesizing phases of alternating current for the electrical rotating induction apparatus according to the versions of the drive waveform signal;
   and supplying the phases of alternating current to full span concentrated windings of a stator of the electrical rotating induction apparatus to electromagnetically rotate the rotating member of the electrical rotating induction apparatus.

4. The method of claim 3, wherein the step of delaying the drive waveform signal to provide multiple versions thereof, comprising multiple delaying steps and wherein each of said delaying steps comprising delaying one of said versions to produce a another one of said versions, and wherein said inverter system comprising a plurality of inverter stages each for synthesizing a phase of alternating current according to a version of the drive waveform signal.

5. The method of claim 4, further comprising: operating said apparatus at magnetic flux densities greater than 130,000 lines per square inch (2.02 Tesla).

6. An electrical rotating apparatus comprising:
   a stator comprising:
      a plurality of slots; and
      full span concentrated windings; and
      N driven phases; and
   a rotor electromagnetically coupled to a magnetic field generated by said stator; and
   a signal generator for generating a drive waveform signal; and
   N signal delay devices, of which a first signal delay device is connected to said signal generator, and the remaining N−1 signal delay devices are connected in series to said first signal delay device; and
   N inverter bridges, for synthesizing current of N phases, of which a first inverter bridge is connected to said signal generator, and the remaining N−1 inverter bridges are connected to a different one of said signal delay devices.

7. The electrical rotating apparatus of claim 6, wherein at least one of said signal delay devices comprises a clock.

8. The electrical rotating apparatus of claim 7, wherein a speed of said apparatus is adjusted by changing a speed of said clock.

9. The electrical rotating apparatus of claim 7, wherein said clock does not have a fixed frequency.

10. The electrical rotating apparatus of claim 6, wherein a speed of said apparatus is adjusted by changing a frequency of said signal generator.

11. The apparatus of claim 6 wherein said drive waveform signal is an analog signal.

12. The apparatus of claim 6 wherein said drive waveform signal is a digital signal.

13. The apparatus of claim 6 wherein said signal delay devices are selected from the group consisting of: shift registers, circular memory devices, bucket brigade devices and switched capacitor signal delay lines.

14. The apparatus of claim 6 wherein said signal delay devices are selected from the group consisting of: analog and digital devices.

15. The apparatus of claim 6 wherein a time-delay of said signal delay devices is fixed, whereby enabling fixed frequency operation.

16. The apparatus of claim 15 wherein said time-delay is equal to the desired phase angle delay at the drive waveform frequency.

17. A method of operating an electrical rotating apparatus comprising:
   generating a drive waveform signal having a pulsing component and a fundamental component;
   synchronizing the frequency of the pulsing component to be in a fixed phase relation to the fundamental component;
   synthesizing more than three inverter phases;
   supplying said phases to windings of a stator of the electrical rotating apparatus, wherein the windings are concentrated and arranged in a full span configuration;
   processing signals from the signal generator to output a plurality of time-delayed versions of the signals, wherein the phase difference between the time-delayed versions of the signals is related to the number of phases in the stator;
   and driving a rotor by electromagnetically connecting the rotor to a magnetic field generated by the stator.

* * * * *